July 1, 1941.  R. A. MITCHELL  2,247,729
COMBINATION CABLE TOOL AND WIRE LINE ROTARY CORE BARREL
Filed Aug. 25, 1939  4 Sheets-Sheet 1

R. A. Mitchell INVENTOR.
BY C. A. Snow & Co.
ATTORNEYS.

July 1, 1941.  R. A. MITCHELL  2,247,729
COMBINATION CABLE TOOL AND WIRE LINE ROTARY CORE BARREL
Filed Aug. 25, 1939  4 Sheets-Sheet 2
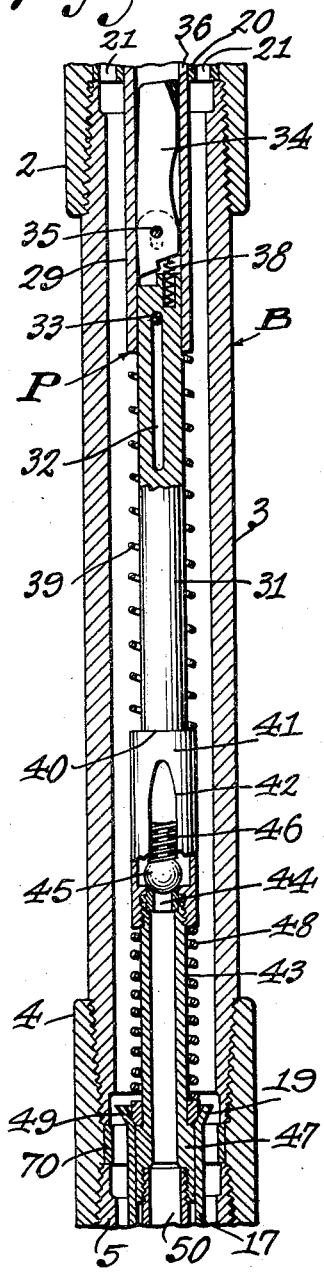
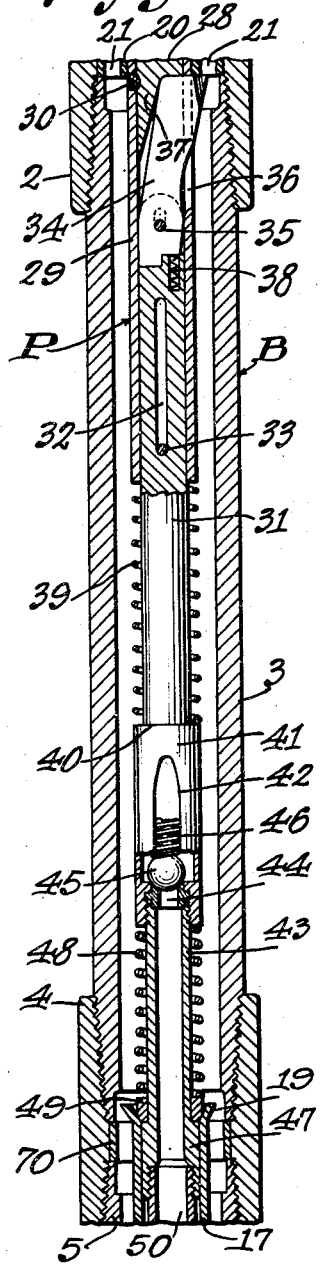
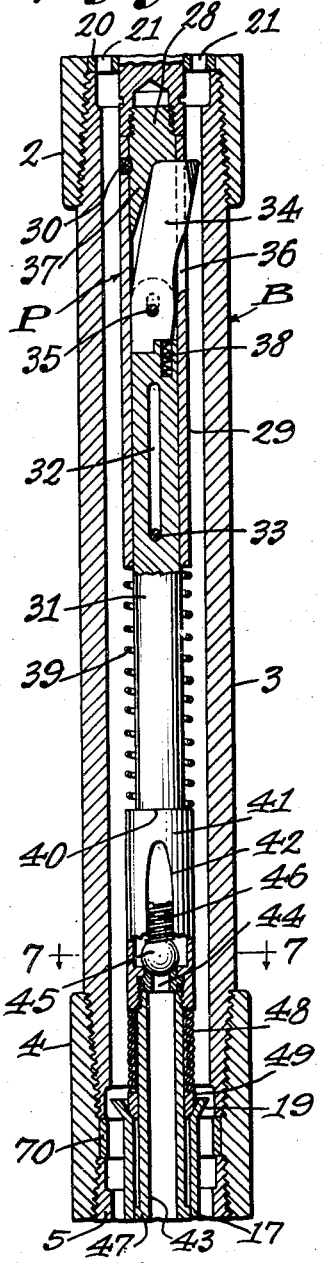
R. A. Mitchell INVENTOR.
BY *C. A. Knowles*
ATTORNEYS.

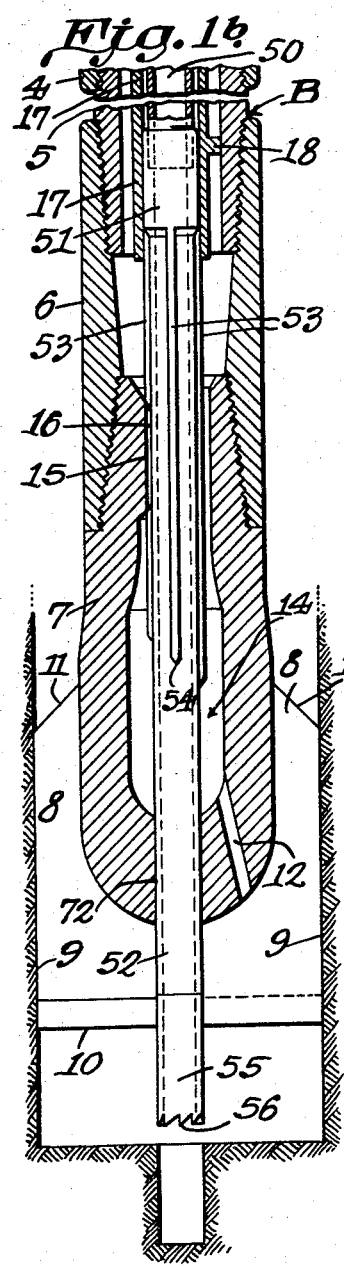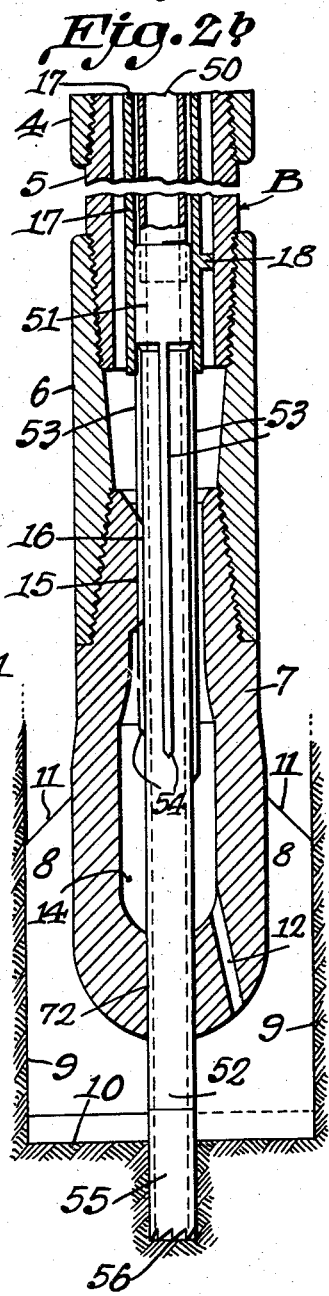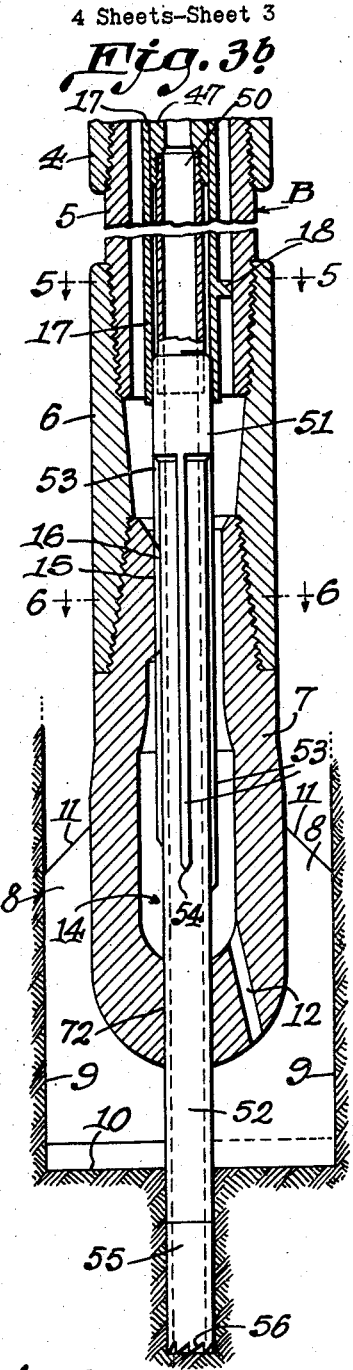

July 1, 1941.  R. A. MITCHELL  2,247,729
COMBINATION CABLE TOOL AND WIRE LINE ROTARY CORE BARREL
Filed Aug. 25, 1939  4 Sheets-Sheet 4
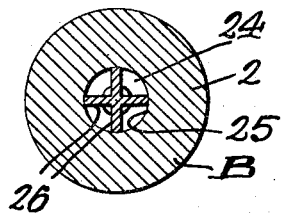
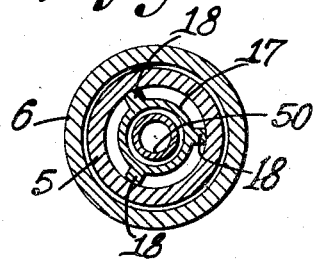
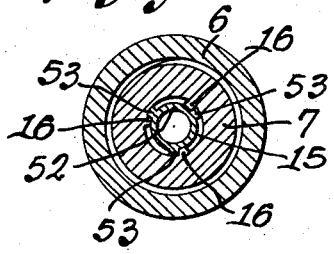
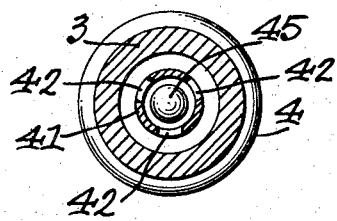
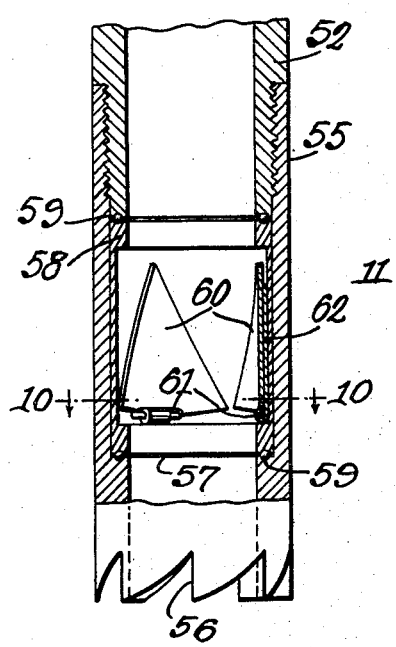
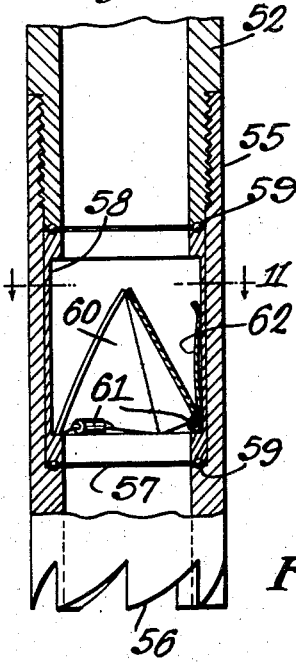
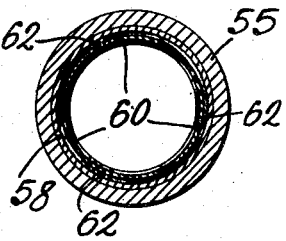
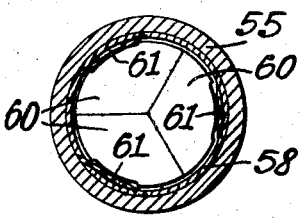
R. A. Mitchell
INVENTOR.
BY
ATTORNEYS.

Patented July 1, 1941

2,247,729

UNITED STATES PATENT OFFICE 2,247,729

COMBINATION CABLE TOOL AND WIRE LINE ROTARY CORE BARREL

Roscoe A. Mitchell, Laredo, Tex., assignor of one-half to George B. Bancroft, San Antonio, Tex.

Application August 25, 1939, Serial No. 291,985

3 Claims. (Cl. 255—72)

This invention aims to provide novel means for taking a core-sample from the bottom of a well which is being drilled, the construction being such that a core may be obtained either in hard or in soft material, there being no practical chance that the core will be lost, and drilling costs being reduced to a minimum.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Figs. 1, 1a and 1b are longitudinal sections which, taken together, show a device constructed in accordance with the invention, the parts being in the positions which they will assume before the core-cutting has been begun;

Figs. 2, 2a and 2b are longitudinal sections which, taken together, show a device constructed in accordance with the invention, the parts being in the positions which they will assume whilst the core-cutting is progressing;

Figs. 3, 3a and 3b are longitudinal sections which, taken together, show a device constructed in accordance with the invention, the parts being in the positions which they will assume when the cutter has been advanced through a soft formation;

Figure 1:
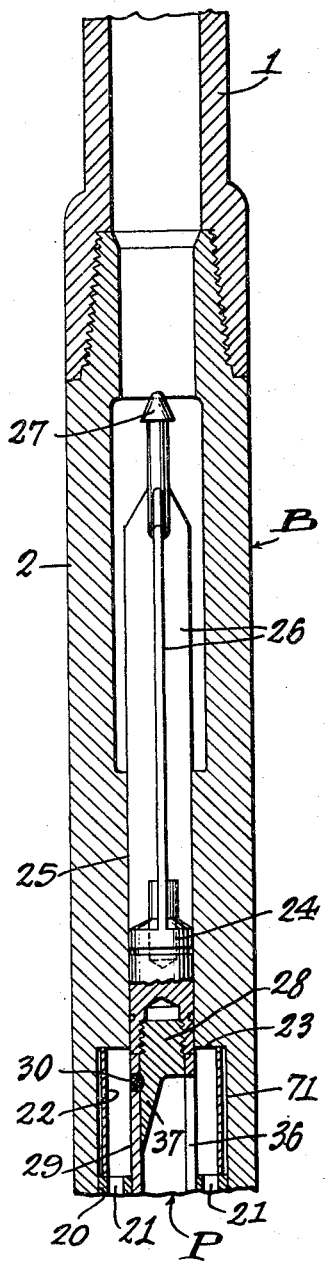

Figs. 4, 5, 6 and 7 are cross sections taken, respectively, on the lines 4—4 of Fig. 1, 5—5 and 6—6 of Fig. 3b, and 7—7 of Fig. 3a;

Figs. 8 and 9 are longitudinal sections taken adjacent the core gates;

Figs. 10 and 11 are cross sections taken, respectively, on the lines 10—10 of Fig. 8 and 11—11 of Fig. 9.

Figure 2:
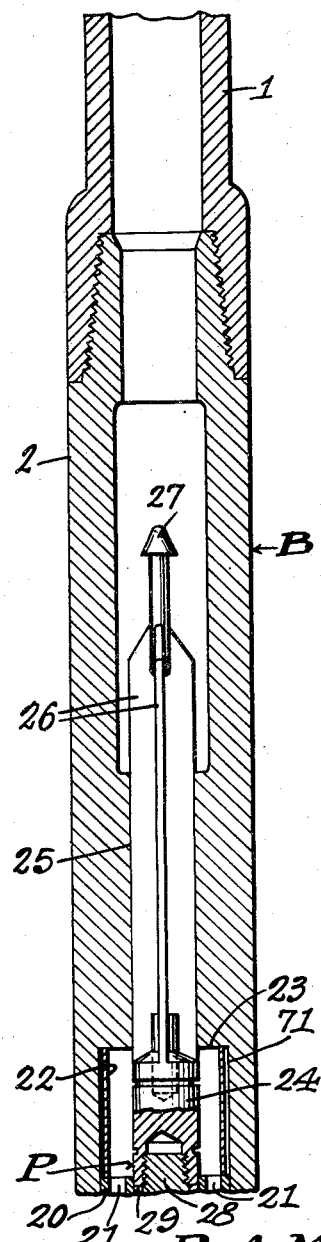
Figure 3:
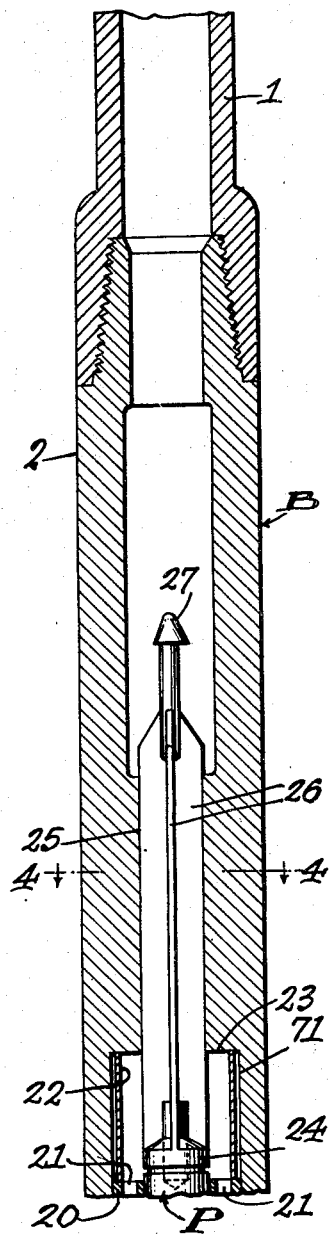

In Figs. 1, 2 and 3, the numeral 1 marks a rotatable drill pipe, to which the ordinary drill bit (not shown) is attached. The well is drilled in the customary manner, to the place where it is suspected that a formation exists which it is desired to sample. The drill pipe 1 then is removed from the hole, and the ordinary drill bit is taken off.

With the drill pipe 1 then is assembled a tubular drill collar B, which comprises an upper section 2, into which is threaded an intermediate section 3, connected by a threaded coupling 4 to a lower section 5, there being an abutment ring 70 between the parts 3 and 5, a threaded coupling 6 joining the lower section 5 to the body of a drill 7, carrying outstanding bits 8 that extend downwardly below the lower end of the drill body. The lateral or reaming edges of the bits 8 are marked by the numeral 9, and the lower cutting edges of the bits are designated by the numeral 10, the upper edges 11 of the bits being inclined, to prevent catching, upon withdrawal.

The lower end of the body of the drill 7 is supplied with any desired number of water outlets 12, communicating with an enlarged chamber 14 in the drill body. It is shown in Figs. 1b–6 that the upper portion of the drill body 7 has a restricted bore 15, leading to the chamber 14, the drill body being provided with internal longitudinal ribs 16, extending into the bore.

Disposed within the lower section 5 of the drill collar B (Figs. 5 and 3b) is a guide tube 17, having outstanding lugs 18 that center and retain it in the section 5. The guide tube 17 extends upwardly into the lower end of the section 3 of the drill collar B, and there the guide tube has a flared mouth 19. A guide ring 20 (Figs. 1a and 1) is disposed within the lower part of the section 2 of the drill collar B and finds an abutment at its lower end against the upper end of the section 3, the ring having openings 21. A retaining sleeve 22 is interposed between the upper end of the ring 20 and an internal shoulder 23 in the section 2, the sleeve being disposed in an enlarged chamber 71 in the section 2.

A piston and core-cutting assembly P is mounted for longitudinal movement in the ring 20, in the guide tube 17, and in a reduced bore 25 in the section 2, the piston assembly including a piston head 24 slidable in the bore 25 and having upstanding, radial guide flanges 26, slidable in the bore 25, the flanges being surmounted by a spearhead 27. A keeper 28 is threaded into the head 24, and to the keeper a tubular housing 29 is welded at 30, or secured otherwise.

A slide rod 31 has limited reciprocation in the lower part of the tubular housing 29, and is provided with a longitudinal slot 32, receiving a cross-pin 33, mounted in the tubular housing 29. A latch 34 is pivoted near its lower end, as indicated at 35, to the slide rod 31, and is adapted to be advanced through a slot 36 in the tubular housing 29 by a wedge-shaped latch-actuator 37 depending from the keeper 28. In order to swing the latch 34 back into the housing 29, as shown in Fig. 1a, a compression spring 38 is interposed between the upper end of the slide rod 31 and the heel of the latch. A compression spring 39 of good strength surrounds a part of the slide rod 31, the spring abutting at its upper end against the housing 29, and at its lower end against a shoulder 40 formed by a hollow foot 41 on the lower end of the slide rod.

The hollow foot 41 has outlet openings 42 that communicate with the section 3 of the drill collar B. An upper tubular conduit member 43 is threaded into the foot 41. A valve seat 44 is held in the foot 41 by the conduit member 43. A ball check valve 45 in the foot 41 is constrained to close downwardly on the seat 44, under the thrust of a compression spring 46 that has an upper end abutment within the foot.

The upper conduit member 43 is enlarged in diameter, as at 47 to fit slidably in the upper part of the guide tube 17. A compression spring 48 surrounds a portion of the conduit member 43, the upper end of the spring abutting against the foot 41, and the lower end of the spring engages a ring 49, through which the conduit member 43 can slide, the ring seating in the flared mouth 19 of the guide tube 17.

A lower tubular conduit member or nipple 50 is threaded into the lower end of the upper conduit member 43, and to the lower end of the lower conduit member is threaded the enlarged head 51 of a hollow cutter support 52, which has lengthwise movement in a bore 72 in the lower part of the drill body 7. The cutter support 52 is provided with longitudinal external ribs 53, of progressively increasing length (Fig. 3b).

When the cutter support 52 and associated parts are lowered to place, the ribs 53 of the cutter support lie alongside the ribs 16 on the drill body 7, as Fig. 6 shows. Since the ribs 53 of the cutter support 52 are of progressively increasing lengths, and because they are pointed at their lower ends as at 54, they will not make impeding end-engagement with the ribs 16 of the drill body 7, when the cutter support 52 and associate parts are lowered to place.

The upper end of a cutter cuff 55 (compare Figs. 8 to 11 with Figs 1b, 2b and 3b) is threaded to a seat on the lower end of the cutter support 52, the lower end of the cuff being supplied with a core cutter 56. Near its lower end, the cuff 55 is equipped with an internal annular shoulder 57.

A tubular core receiver 58 is mounted to turn in the cuff 55, and end-thrust ball bearings 59 are disposed between the ends of the core receiver and the shoulder 53 and the end of the cutter support 52. Upwardly-tapered core-holding gates 60 have their lower ends hinged at 61, within the core receiver 58. Spring tongues 62 on the lower ends of the core gates 60 bear against the inside of the receiver 58 and hold the gates yieldably in the position of Fig. 9.

In practical operation, the drill pipe 1 is removed from the drill hole, and the ordinary drill (not shown) is removed, its place being taken by the drill collar B, the uppermost element of which is the section 2 of Fig. 1, the lowermost element of which is the drill body 7 of Fig. 1b. The drill pipe 1 and the drill collar B are lowered into the hole.

By means of any suitable mechanism (not shown), engaging the spearhead 27 of Fig. 1, the piston and core-cutting assembly P is lowered to place, the upper member of that assembly being the spearhead, and the lower member thereof being the cutter 56 of Figs. 1b and 8, the ring 49 of Fig. 1a being seated on the flared mouth 19 of the guide tube 17.

Water is forced through the drill pipe 1 of Fig. 1, and pressure is exerted on the piston head 24 (Fig. 1) of the piston and core-cutter assembly P, the cutter cuff 55 being advanced until the core cutter 56 is below the edges 10 of the bits 8, as in Fig. 1b.

The piston head 24 reaches the position of Fig. 2, and then there is established a circulation down to the bits 8 of Fig. 1b, by way of the drill pipe 1 (Fig. 2), the bore 25 of the section 2, the sleeve 22, the holes 21 in the ring 20 (pass to Fig. 1a), the section 3, the ring 70, the coupling 4, the section 5 (Fig. 1b), the coupling 6, the chamber 14 of the drill body 7, and the outlets 12. An upward vent is afforded through the cutter cuff 55, the cutter carrier 52, the conduit member 50, the conduit member 43, and the openings 42 of the foot 41, since the check valve 45 can open, responsive to upward pressure.

When the piston and core-cutter assembly P is forced downwardly by hydraulic pressure, from the position of Fig. 1a, the spring 39 is compressed, the function of that spring being to return the parts, ultimately, to the position of Fig. 1a. The actuator 37 carries the latch 34 outwardly to the position of Fig. 2a, through the slot 36 in the housing 29, until the latch engages under the ring 20, which forms a shoulder, and thus the core cutter 56 is locked in advanced position.

When rotation is imparted to the tube 1 of Fig. 1, rotation is imparted to the drill collar B, and the core cutter 56 of Fig. 1 participates in that rotation; because, as shown in Fig. 6, the ribs 16 of the member 7 of the drill collar B are in contact, side to side, with the ribs 53 of the cutter support 52.

The cutter 56 forms the sample core, the core rising in the core receiver 58, and passing into the cutter support or core barrel 52, the gates 60 functioning to retain the core against downward movement. When the piston assembly P and associated parts are drawn up, the cuff 55 can be detached from the core carrier 52, and the core removed for examination.

By raising the drill collar B, the pressure of the ring shoulder 20 (Fig. 2a) on the latch 34 is relieved, and as the piston and core cutter assembly P is raised by the spring 39, the latch actuator 37 moves out of contact with the latch, and the latch can retire to the retracted position of Fig. 1a, under the impulse of the spring 38. Since the core receiver 58 is rotatably mounted on the ball bearings 59, there is less strain on the gates 60, as the core is entering the core receiver. The gates 60 close tightly, and if the ball valve 45 happens to be leaking a little, a soft core will not be washed away.

The core cutter 56 of Fig. 8 may encounter a soft earth or sand formation, which does not call for a rotary cutting operation. Even though the piston head 24 of the piston and core cutter assembly P is in the position of Fig. 2, the pump pressure on it is greater than the resistance offered by the soft formation, and the piston and core cutter assembly P will be forced down by pump pressure, to the position of Figs. 3a and 3b, the spring 48 being compressed, to restore the parts to the condition of Fig. 2a.

The device shown and described will reduce drilling costs, make a more perfect core recovery, and prevent the loss of cores.

Having thus described the invention, what is claimed is:

1. In a core-forming machine, a tubular collar having a liquid outlet at its lower end, and provided with a shoulder, a piston assembly including a piston slidable downwardly in the collar, under liquid pressure, to a position in which there will be a flow of liquid through the collar to the outlet, a slide whereon the piston assembly has limited longitudinal reciprocation, a core cutter carried by the slide, a latch movably mounted on the slide, the piston assembly including a part engaging the latch to move it outwardly for engagement with the shoulder when the piston assembly moves downwardly with respect to the slide, and spring means for retracting the latch out of engagement with the shoulder when the piston assembly is raised with respect to the slide.

2. In a core-forming machine, a tubular collar provided near its upper end with a cylinder, and having a liquid outlet at its lower end, the collar being provided with a shoulder, a piston assembly including a piston which is shaped to reciprocate in the cylinder, a slide whereon the piston assembly has limited longitudinal reciprocation, means for resisting the downward movement of the slide, a core cutter carried by the slide, a latch movably mounted on the slide, the piston assembly including a part engaging the latch to move it outwardly for engagement with the shoulder when the piston moves downwardly in the cylinder and with respect to the slide, interengaging elements on the piston assembly and on the latch, coacting to retract the latch out of engagement with the shoulder when the piston assembly is raised with respect to the slide, and spring means acting on the piston assembly and the slide to raise the piston assembly to a position in which the piston is in the cylinder, and under liquid pressure, whilst the downward movement of the slide is resisted, the spring means being compressible under liquid pressure, to such a degree that the piston may move downwardly, under liquid pressure, to a position in which there will be a flow of liquid through the collar, to the outlet.

3. In a core-forming machine, a tubular collar provided near its upper end with a cylinder, and having a liquid outlet at its lower end, the collar being provided with a shoulder, a piston assembly including a piston normally extended into the cylinder and slidable downwardly in the cylinder, under liquid pressure in the cylinder, to a position clear of the cylinder and in which there will be a flow of liquid through the cylinder and the portion of the collar therebelow to the outlet, a slide whereon the piston assembly has limited longitudinal reciprocation, a core cutter carried by the slide, a latch movably mounted on the slide, the piston assembly including a part engaging the latch to move it outwardly for engagement with the shoulder when the piston moves downwardly in the cylinder and with respect to the slide, a compression spring having an abutment at its upper end against the piston structure, and at its lower end against the slide, and spring means for retracting the latch out of engagement with the shoulder when the piston assembly is raised with respect to the slide, to disengage said part of the piston assembly from the latch.

ROSCOE A. MITCHELL.